(12) United States Patent
Yi et al.

(10) Patent No.: US 9,390,220 B2
(45) Date of Patent: Jul. 12, 2016

(54) BUS-BASED CLOCK TO OUT PATH OPTIMIZATION

(71) Applicant: Lattice Semiconductor Corporation, Hillsboro, OR (US)

(72) Inventors: Yanhua Yi, Cupertino, CA (US); Jun Zhao, Fremont, CA (US)

(73) Assignee: LATTICE SEMICONDUCTOR CORPORATION, Portland, OR (US)

( * ) Notice: Subject to any disclaimer, the term of this patent is extended or adjusted under 35 U.S.C. 154(b) by 0 days.

(21) Appl. No.: 14/339,229

(22) Filed: Jul. 23, 2014

(65) Prior Publication Data

US 2016/0026746 A1    Jan. 28, 2016

(51) Int. Cl.
*G06F 17/50* (2006.01)

(52) U.S. Cl.
CPC ........ *G06F 17/5081* (2013.01); *G06F 17/5077* (2013.01)

(58) Field of Classification Search
CPC ............ G06F 17/5054; G06F 2217/62; G06F 17/5081; G06F 17/5077; G06F 2217/84; H03K 19/1774
USPC .......................................... 716/113
See application file for complete search history.

(56) References Cited

U.S. PATENT DOCUMENTS

| | | |
|---|---|---|
| 6,952,813 B1 | 10/2005 | Rahut |
| 7,509,598 B1 | 3/2009 | Shen et al. |
| 8,181,139 B1 | 5/2012 | Chen et al. |
| 8,261,218 B1 * | 9/2012 | Fung .............................. 716/108 |
| 2007/0050742 A1 * | 3/2007 | Yonezawa .......................... 716/6 |

* cited by examiner

*Primary Examiner* — Vuthe Siek

(57) ABSTRACT

A place and route technique is provided for a programmable logic device to optimize a delay difference between a bus including a plurality of clock to out paths and a corresponding clock out path.

19 Claims, 4 Drawing Sheets

BUS-BASED CLOCK TO OUT PATH OPTIMIZATION

TECHNICAL FIELD

The present invention relates generally to timing in programmable logic circuits and more particularly to a technique to satisfy a desired clock to out timing requirement for a configured programmable logic device.

BACKGROUND

A programmable logic device (PLD) such as a field programmable gate array (FPGA) requires configuration by the user before normal operation. Various programming systems exist that enable a user to shift in configuration data into the PLD to effect a desired logical function. There are corresponding types of elements or components that are configured by the resulting stored configuration data within the PLD. The primary component being configured may be referred to as the programmable fabric—in the case of a field programmable gate array (FPGA), the programmable fabric includes a plurality of lookup-table-based logic blocks as well as an associated routing structure. The configuration data for the programmable fabric is typically stored in a volatile FPGA memory (SRAM) and is shifted into the device through a dedicated data shift register (DSR).

The configuration process typically starts with the user translating the desired logical function that a user desired to implement on the PLD into a hardware description language (HDL) on the programming system, which is typically a PC configured with the appropriate programming software. The programming PC, through its associated software, translates the user's HDL into a netlist. This netlist is then mapped by the programming PC to the resources corresponding to the particular type of FPGA being configured. The programming system can then perform a route and place routine in which the logic elements from the user's design are assigned to corresponding resources within the FPGA being programmed. The resulting mapping is fine-tuned and debugged during a simulation stage. Once the design is deemed satisfactory, a corresponding bitstream is generated that is downloaded into the FPGA.

The placing and routing of the mapped netlist into the programmable fabric of an FPGA involves numerous choices. For example, suppose the mapped netlist requires a signal flow through a particular combination of logic gates. Because of the placing and routing flexibility in the programmable fabric, the programmable logic blocks could be relatively close to each other or relatively far from each other. The routing delay through the potential paths can thus vary considerably. This flexibility is constrained, however, by any required timing on the signal flow path. One particular type of timing requirement is known as the clock to output (typically abbreviated as the "clock to out"), which defines the delay that elapsed from the time when a clock edge arrives at an FPGA input pin to when the associated data is valid at its FPGA output pin. The clock to out requirement is generally expressed as a maximum allowed value—a given placing and routing of the mapped netlist may be able to achieve a smaller clock to out value. However, some designs also involve a minimum clock to out value, which would be the earliest time at which the FPGA could deliver the associated data to its pin. The clock to out timing may also defined with regard to a clock output from an FPGA pin. In that regard, the same clock having the clock edge that is received at the FPGA pin discussed above may propagate through a combinatorial path in a configured portion of the programmable fabric to a corresponding FPGA clock output pin. The clock to out timing requirement may then be defined as the maximum and/or minimum delay difference from when the data is valid at its output pin to when the clock is valid at its clock output pin. Conventional placing and routing software has difficulty converging to a particular placing and routing choice that satisfies such a relative delay requirement.

Accordingly, there is a need in the art for improved placing and routing software that can efficiently accommodate a relative clock to out vs. clock out timing requirement.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1:
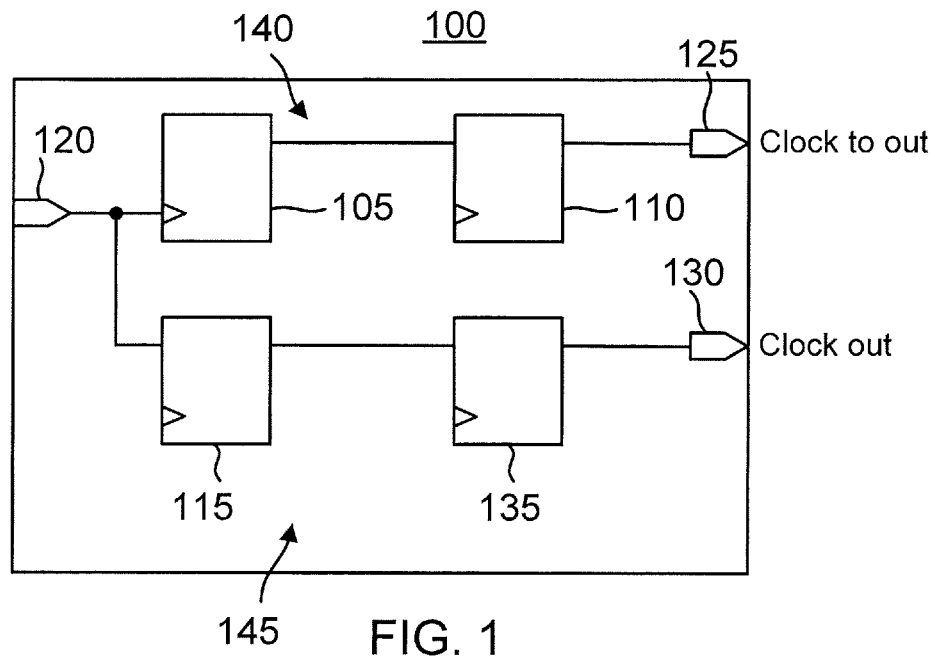
FIG. 1 is a schematic diagram of clock to out path and a clock out path in an FPGA that has its timing optimized in accordance with an embodiment of the disclosure.

As discussed earlier, a clock to out timing requirement defines the delay from when a clock edge is received at its FPGA input pin until the corresponding data is valid at its output pin. As used herein, "pin" is a generic term to cover the structure such as a pad or an actual pin that an integrated circuit uses to couple to leads on circuit board or to other physical interconnects (e.g., package interconnect or through-hole via interconnect). The clock to out path is the path from the FPGA input pin to the FPGA output pin over which the clock to out timing is determined. An example clock to out path 140 is illustrated in FIG. 1 for an FPGA 100. Clock to out path 140 extends from an input pin 120 to an output pin 125. Clock to out path 140 is a result of the placed and routed mapped netlist that is desired for this particular data signal. In general, the placing and routing of the mapped netlist will involve assorted programmable logic blocks. These programmable logic blocks are organized into slices as is conventional in the programmable logic arts. Each slice includes a certain number of look-up tables such as four 16-bit lookup tables. Due to timing concerns regarding latency, a data path such as a clock to out path will preferably involve relatively few slices. A typical clock to out path thus will pass through two slices but it will be appreciated that as little as one slice or more than two slices may be included within a clock to out path. The following discussion will assume without loss of generality that a clock to out path such as example clock to out path 140 comprises two slices.

A clocked slice 105 in clock to out path 140 is clocked by the clock driven through input pin 120 to generate a data signal that is transmitted through the remainder of clock to out path 140. Clocked slice 105 may thus also be denoted as a sequential slice in that the clocking triggers the processing of a stored state in clocked slice 105. The resulting data signal on output pin 125 is thus responsive to clocked slice 105 being clocked by the clock signal that is received on input pin 120. The data signal generated by clocked slice 105 is received by a combinatorial (not clocked by the clock signal received on input pin 120) slice 110 in clock to out path 140 that in turn generates the data signal that is driven out on output pin 125. Note that the remainder of clock to out path 140 from clocked slice 105 though combinatorial slice 110 to output pin 125 is combinatorial—in other words, the clock signal received on input pin 120 does not clock any of the remaining slice(s) in clock to out path 140 such as combinatorial slice 110. The total delay across clock to out path 140 may be subdivided with regard to slices 105 and 110 into a first delay from input pin 120 to clocked slice 105, a second delay from clocked slice 105 to combinatorial slice 110, and a third delay from combinatorial slice 110 to output pin 125.

The clock out delay corresponds to the delay from receipt of the clock signal at input FPGA pin 120 to when a corresponding clock edge is present at output FPGA pin 125. A clock out path is the path traveled by the clock signal from its input pin to the clock output pin. Just like a clock to out path, it is desirable to control the clock out path so as to be within an acceptable amount of latency. Thus, the number of slices within the clock out path is typically small. The following discussion will be directed to embodiments in which the clock out path traverses two slices but it will be appreciated that as few as one slice or more than two slices may be implemented in alternate embodiments.

An example clock out path 145 in FPGA 100 also originates at input pin 120. However, clock out path 145 is entirely combinatorial in that the included slices such as a first slice 115 and a second slice 135 that are not clocked by the clock signal propagating through clock out path 145 to a clock output pin 130. For example, slices 115 and 135 may be programmed to merely buffer and thus boost the clock signal ultimately delivered at clock output pin 130. Alternately, one of the slices 115 and 135 may function to invert the clock signal propagating across clock out path 145. Analogous to the clock to out delay, the total delay across clock out path 145 may be subdivided into a first delay from input pin 120 to first slice 115, a second delay from first slice 115 to second slice 135, and a third delay from second slice 135 to clock output pin 130.

The placing and routing software that instantiates the slices 105, 110, 115, and 135 within the two paths 140 and 145 controls the timing on these paths. A user specifies a timing requirement for the various paths to the placing and routing software such as through a preference file (prf). For example, the delay across clock to out path 140 may be designated as a variable dcto. Similarly, the delay across clock out path 145 may be designated as a variable dco. The timing requirement may set a maximum difference max_prf between the two delays such that dcto-dco is less than max_prf, where max_prf is a variable that represents the maximum allowable amount of delay difference between the clock to out and clock out paths. In addition, the timing requirement may also set a minimum difference min_prf between the two path delays, where min_prf is a variable that represents the minimum allowable amount of delay difference.

Figure 5:
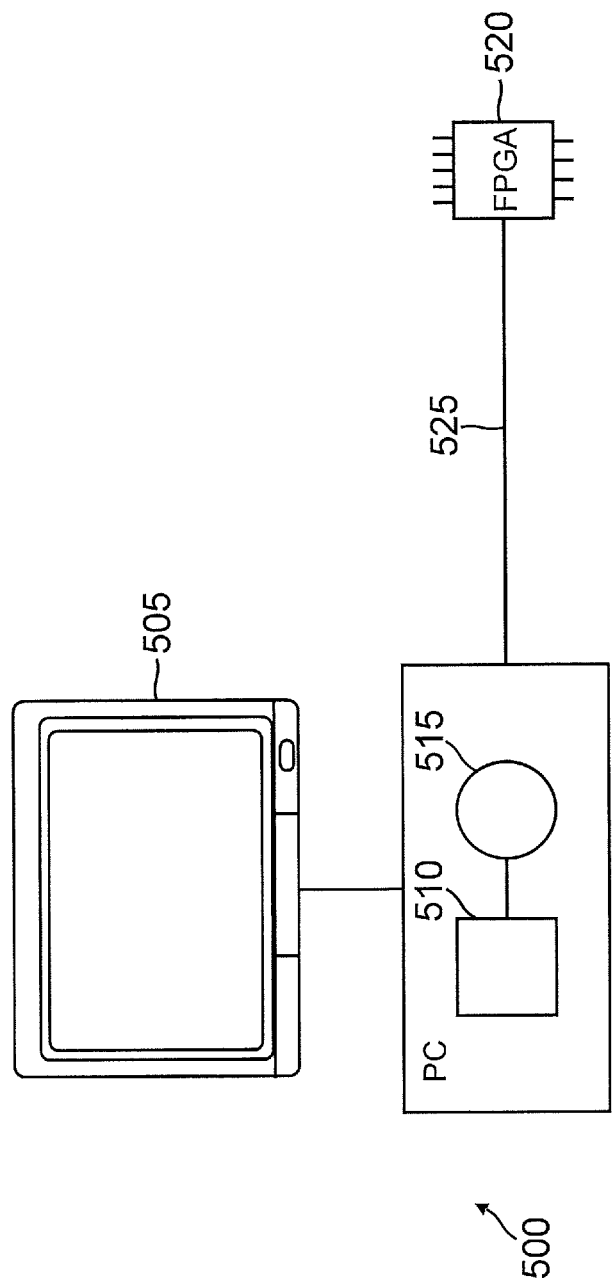
FIG. 5 is a diagram of an example FPGA programming tool configured to optimize the timing of clock to out and corresponding clock out paths in an FPGA in accordance with an embodiment of the disclosure.

The placing and routing algorithm implemented in software as disclosed herein is configured to satisfy the maximum (and minimum as necessary) amount of difference between the two path delays that is permissible. In prior art approaches, the placing and routing algorithm would merely minimize the clock to out path delay. In contrast, the placing and routing algorithm disclosed herein not only minimizes the clock to out path delay but also increases the clock out delay so as to satisfy the maximum allowed difference between the two path delays. An example system 500 for performing the placing and routing algorithm is shown in FIG. 5. System 500 is configured to perform a configuration of an FPGA 520. System 500 includes a display 505 and a processor 510 for implementing instructions stored on a non-transitory computer readable medium 515. These instructions optimize the clock to out and clock out path delays as discussed herein. Upon completion of all the necessary process flows for configuration of FPGA 520, system 500 creates a configuration bitstream 525 that is downloaded into FPGA 520 to complete the configuration process.

Figure 6:
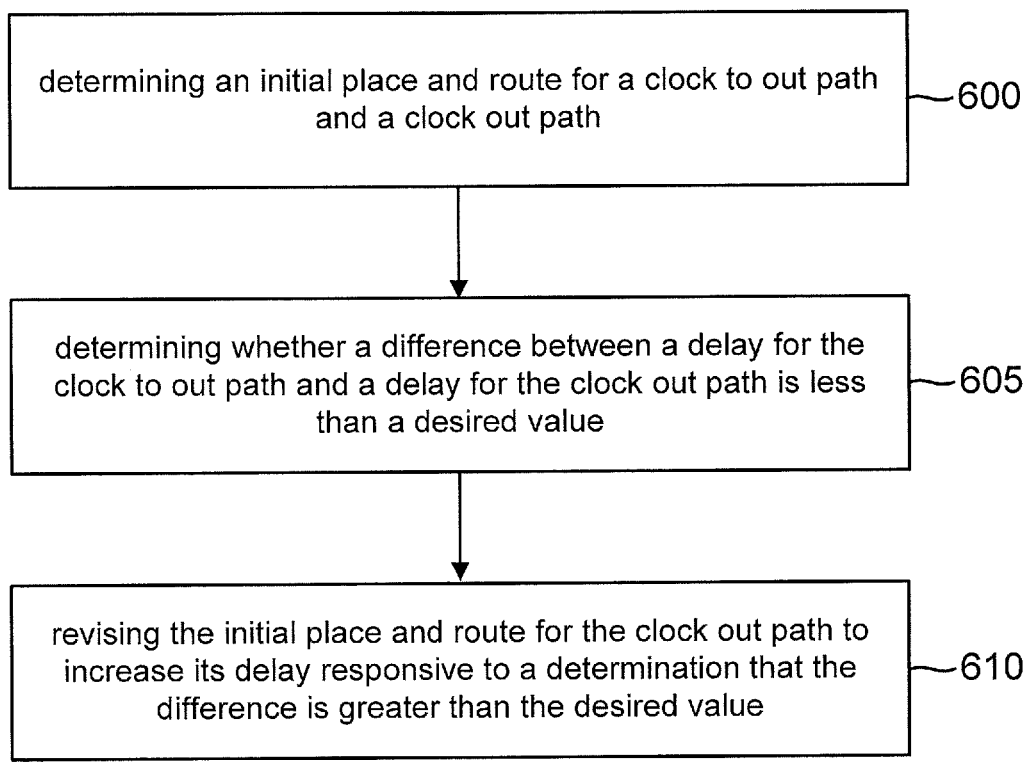
FIG. 6 is a flowchart of a method to optimize the timing of clock to out and corresponding clock out paths in an FPGA in accordance with an embodiment of the disclosure.

A flowchart for a method of placing and routing performed by system 500 so as to satisfy a required maximum difference between the clock to out path delay and the clock out path delay is shown in FIG. 6. The method includes a processor-performed act 600 of determining an initial place and route for a clock to out path and a clock out path. The method also includes a processor-performed act 605 of determining whether a difference between a delay for the clock to out path and a delay for the clock out path is less than a desired value. Finally, the method includes a processor-performed act 610 of revising the initial place and route for the clock out path to increase its delay responsive to a determination that the difference is greater than the desired value. For example, the place and route software tool may select slices 115 and 135 so that these slices are farther apart in FPGA 100 than in the initially placed and routed clock out path 145b so as to increase the delay on clock out path 145.

Figure 2:
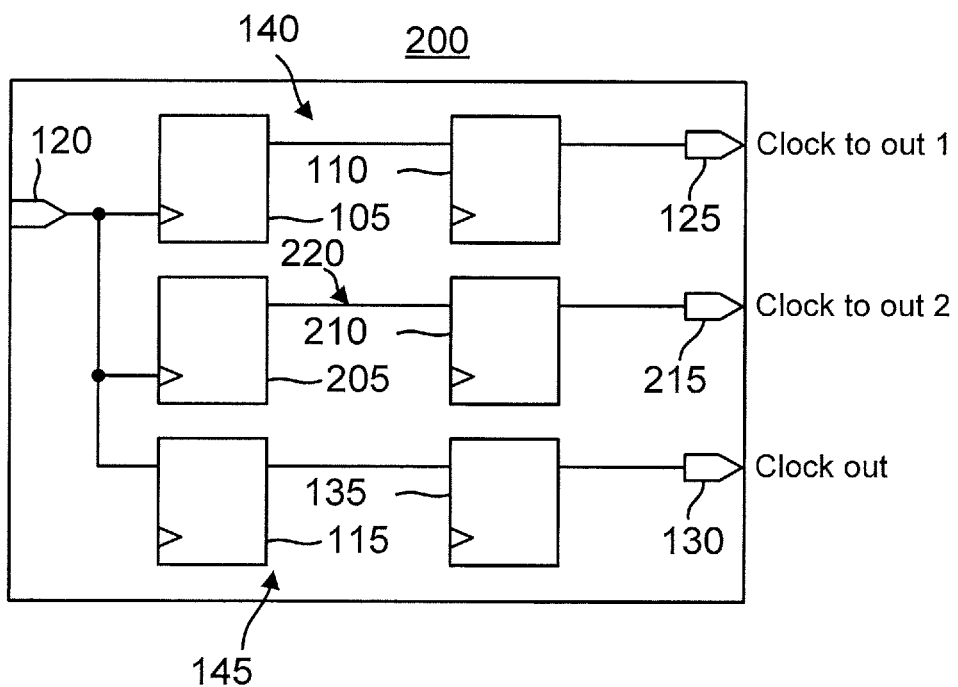
FIG. 2 is a schematic diagram of a pair of clock to out paths and a corresponding clock out path in an FPGA that has its timing optimized in accordance with an embodiment of the disclosure.

While such a place and route algorithm for the first time minimizes the delay on the clock to out path and, if necessary, increases the delay on the clock out path so as to satisfy a maximum difference between the delays, note that it is not uncommon for a clock to out path to be part of a data bus that carries other data signals on corresponding clock to out paths. A plurality of maximum delay differences for the various clock to out path paths as compared to the corresponding clock out delay (or delays) must then be satisfied. An example data bus formed by clock to out path 140 and a clock to out path 220 is shown in FIG. 2 for an FPGA 200. Clock to out path 140 is as described with regard to FPGA 100 and thus extends between input pin 120 and output pin 125 and includes clocked slice 105 and combinatorial slice 110. The clock received at input pin 120 also clocks a clocked slice 205 in clock to out path 220. The data signal that is then generated responsive to this clocking propagates through a combinatorial slice 210 in clock to out path 220 to a second output pin 215. Clock out path 145 is as discussed with regard to FPGA 100.

But note the complication in that one cannot blindly increase the clock out delay for clock out path 145 in that it affects both delay differences. In other words, suppose there is both a minimum value and a maximum value that must be satisfied for the delay differences for clock to out paths 140 and 220. In addition, suppose that the minimum delay difference is 5 nanoseconds (ns) and the maximum delay difference is 10 ns for both clock to out paths 140 and 220. If the initial clock to out delay (dcto1) across clock to out path 140 is 20 ns and the initial clock out delay (dco) across clock out path 145 is 10 ns, then the delay difference between the dcto1 and dco delays satisfies both the minimum value of 5 ns and the maximum value of 10 ns. On the other hand, if the clock to out delay (dcto2) for clock to out path 220 is 10 ns, then the resulting delay difference between dcto2 and dco of 0 ns violates the minimum allowed difference of 5 ns. The place and route algorithm disclosed herein finds a solution for this problem by introducing an individual delay offset for the various clock to out paths within a bus such as within FPGA 200.

In the following example, the minimum delay difference between dcto1 and dco for clock to out path 140 is denoted as min1 whereas the maximum delay difference between dcto1 and dco for clock to out path 140 is denoted as max1. Similarly, the minimum delay difference between dcto2 and dco for clock to out path 220 is denoted as min2 whereas the maximum delay difference is denoted as max2. Given these definitions, the inequalities of:

$$\text{min1} \leq dcto1 - dco \leq \text{max1} \quad (1)$$

$$\text{min2} \leq dcto2 - dco \leq \text{max2} \quad (2)$$

are established. If equality (2) is multiplied by −1 and the resulting inequalities added, the following inequality results:

$$\text{min1} - \text{max2} \leq dcto1 - dcto2 \leq \text{max1} - \text{min2} \quad (3)$$

Inequality (3) is denoted herein as an alignment bus constraint as it is used to determine the individual delay offsets for the clock to out paths as necessary so that inequality (3) is satisfied. Given inequality (3), an individual delay Δ1 for dcto1 and an individual delay Δ2 for dcto2 may be determined. Suppose again that the minimum delay difference between each clock to out delay and the corresponding clock out delay is 5 nanoseconds (ns) and that the maximum delay difference is 10 ns. Delays dcto1 and dcto2 will again be assumed to equal 20 ns and 10 ns, respectively. Given such values, there is no adjustment necessary for dcto1 so Δ1 may be assumed to be zero and inequality (3) would then devolve to:

$$-5 \text{ ns} \leq dcto1 - dcto2 \leq 5 \text{ ns} \quad (4)$$

The individual delay Δ2 for dcto2 for clock to out path 220 may thus range from 5 ns to 15 ns. This is true because if Δ2 equals 5 ns, then dcto1−dcto2 equals 5 ns (assuming that dcto2 represents its initial value plus the individual delay offset Δ2), which satisfies inequality (4). Similarly, if Δ2 equals 15 ns, then dcto1−dcto2 equals −5 ns (assuming again that dcto2 includes its delay adjustment Δ2), which again satisfies inequality (4).

As discussed analogously above with regard to FIG. 1, should the delay differences of (dcto1−dco) and (dcto2−dco) not satisfy their maximum allowed values, dco may be increased as necessary. From inequality (4), dcto2 may be increased to as much as 25 ns (the original value of 10 ns plus the 15 ns delay adjustment Δ2). But in that case the delay difference between dcto2 and dco would violate the maximum allowed value of 10 ns. Thus, the delay dco for clock out path 145 may be increased to 20 ns to satisfy the desired maximum delay difference between dcto2 and dco.

This increase in dco, however, raises another issue in that the minimum required delay difference values may now be violated. For example, inequality (1) may be rewritten as:

$$\text{min1} + dco \leq dcto1 \leq \text{max1} + dco \quad (5)$$

Inequality (5) may be used to determine an offset ΔC that is added to both dcto1 and dcto2 so that the minimum delay difference requirement is not violated. Given that dcto1 and Δ1 have already been determined to be 20 ns and 0, respectively, inequality (5) leads to a possible solution of ΔC equaling 10 ns. One can see that this value for ΔC is satisfactory for the example in which min1 is 5 ns and max1 is 10 ns. In that case, inequality (5) becomes 25 ns≤30 ns≤30 ns, which is of course true.

The range on dcto2 for clock to out path 220 must now be checked. In particular, the inequality (2) may be rewritten as $$\text{min2} + dco \leq dcto2 \leq \text{max2} + dco \quad (6)$$

In the example above, dcto2 (which is presumed to include its delay adjustment Δ2 plus the offset ΔC) may range from 25 ns to 35 ns. But inequality (6) demands that the individual delay offset Δ2 range previously determined to be from 5 ns to 15 ns be adjusted to instead range from 5 ns to 10 ns. For example, if delay offset Δ2 equals 10 ns, inequality (6) becomes 25 ns≤30 ns≤30 ns, which is of course true.

The preceding bus-based timing algorithm may be generalized to include any number of clock to out paths that share a common clock out path. Referring again to inequality (3), this inequality would be applied to each pair of clock to out paths across the bus. For example, suppose there are M clock to out paths (M being a plural positive integer). By the binomial theorem, there would be M!/(2*(n−2)!) different pairs of clock to out paths in a bus having the M clock to out paths. The individual delay offset for each clock to out path would then be determined for the various pairs of clock to out paths. The number of inequalities (5) and (6) is determined by the number of the individual clock to out paths. More generally, if one has M clock to out paths in the bus, there would be M inequalities having the format of inequalities (5) and (6) that would be used to determine the common delay offset for the clock to out path delays.

Consider the application of the algorithm to a given pair of clock to out paths. One of the clock to out paths may be deemed to be a first clock to out path corresponding to the max1 and min1 delays discussed above. Similarly, a remaining one of the clock to out paths in the pair may be deemed to be a second clock to out path corresponding to the max2 and min2 delays discussed above. Inequality (3) may then be applied accordingly.

The algorithm may be summarized as including two phases. In a first phase, the clock to out adjustment delays (e.g., Δ1 and Δ2 discussed above) are determined for each pair of clock to out paths based upon the maximum values for the dcto delays being satisfied using the cross-prf inequalities having the format of inequality (3). In a second phase, the maximum delay difference constraints are used to determine whether the clock out delay should be increased. If this increase in the clock out delay then leads to a violation in the minimum delay differences, a common delay offset is determined that is added to all the clock to out delays.

Figure 3:
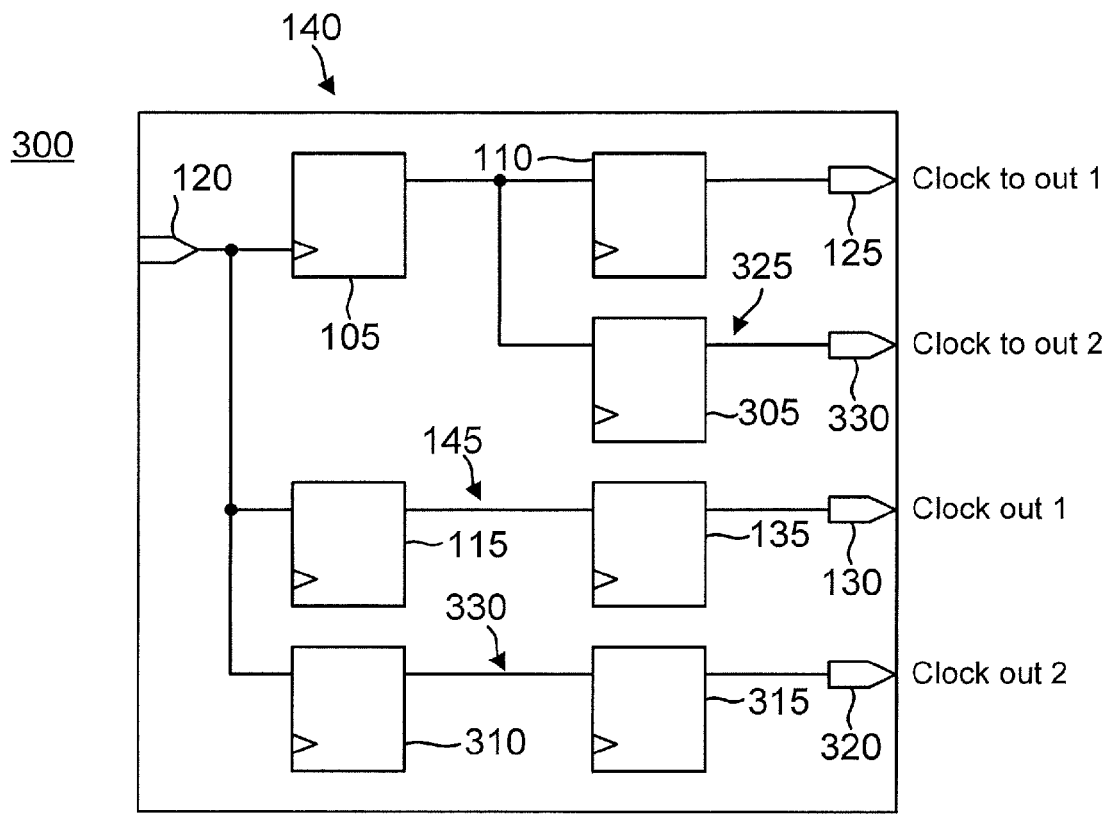
FIG. 3 is a schematic diagram of a pair of clock to out paths including a common slice and a pair of corresponding clock out paths in an FPGA that has its timing optimized in accordance with an embodiment of the disclosure.

Notice the power of this technique: for the first time, the place and route software can determine individual dcto and dco values that satisfy all the various minimum and maximum delay differences for a data bus. Once the various dcto and dco values are calculated, the placing and routing of the paths is performed so as to be within the required delay range (if a range is specified) or to equal the desired delay value. Complications arise, however, in that not all data buses have the arrangement shown in FIG. 2. In particular, note that no delay path shares a segment with any of the other delay paths. But it may be that such shared segments exist. For example, consider FPGA 300 illustrated in FIG. 3. A clock to out path 140 and a clock out path 145 are as discussed with regard to FIG. 1. A clock to out path 325 extends from input pin 120 to an output pin 330. But clock out path 325 includes clocked slice 105. The data signal from clock slice 105 propagates in clock out path 325 to a combinatorial slice 305 and from combinatorial slice 305 to output pin 330. A delay dl from input pin 120 to clocked slice 105 is thus common to both clock to out paths. A clock out path 330 is independent from clock out path 145 in that it extends from input pin 120 through a first slice 310 and a second slice 315 to a clock output pin 320. The delay across clock to out path 140 may be denoted as dcto1. This delay dcto1 must satisfy a minimum and maximum difference with regard to a delay dco1 across clock out path 145. Similarly, the delay across clock to out path 330 may be denoted as dcto2. The delay dcto2 must satisfy a minimum and maximum difference with regard to a delay dco2 across clock out path 330.

Figure 4:
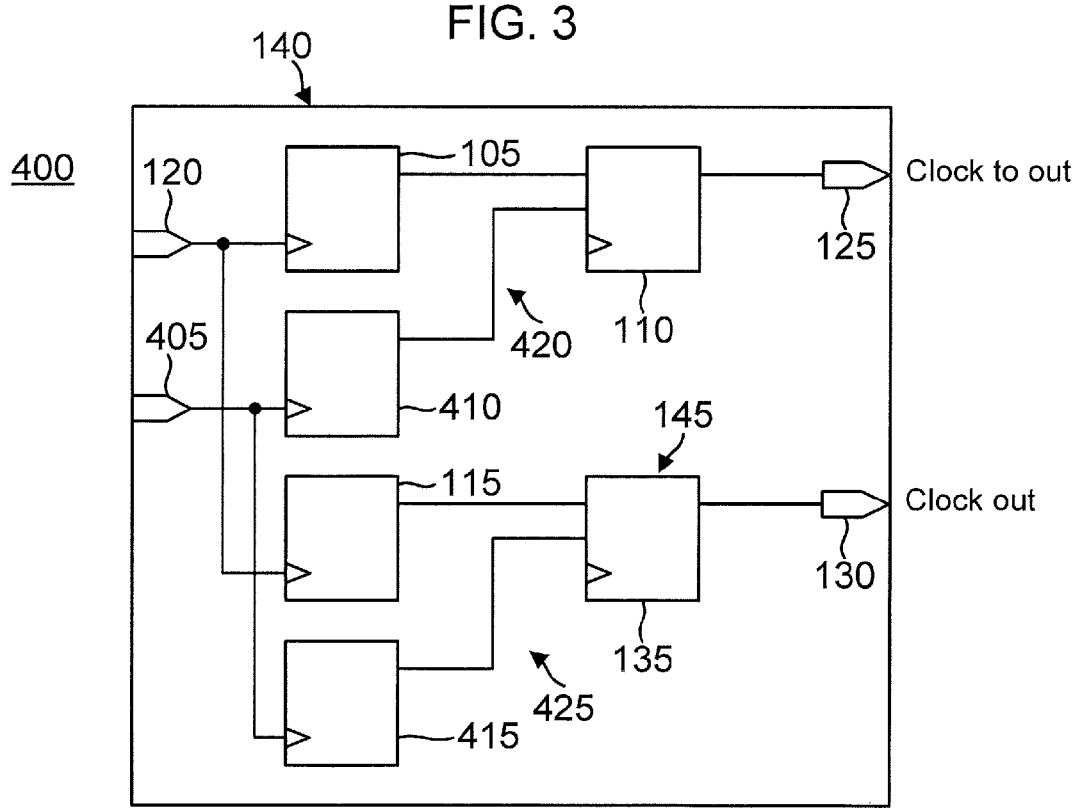
FIG. 4 is a schematic diagram of a pair of clock to out paths sharing a common output pin and a pair of corresponding clock out paths that also share a common output pin in an FPGA that has its timing optimized in accordance with an embodiment of the disclosure.

If delay is added to dcto1 through delay dl, one can immediately appreciate that it will affect both the delay difference between dcto1 and dco1 as well as the delay difference between dcto2 and dco2. An analogous complication exists for FPGA 400 shown in FIG. 4. In FPGA 400, clock to out path 140 and clock out path 145 are as discussed with regard to FIG. 1. Another clock to out path 420 shares output pin 125 but is triggered by a different clock as received on an input pin 405. This received clock clocks a clocked slice 410 to generate a data signal that propagates through sequential slice 110 before reaching output pin 125. A clock out path 425 extends from input pin 405 through a first slice 415 and second slice 135 to clock output pin 130. Clock out path 425 thus shares the same delay from second slice 135 to clock output pin 130 as does clock out path 145. Similarly, clock to out path 420 shares the same delay from sequential slice 110 to output pin 125 as does clock to out path 140.

To account for the shared portions of the clock to out and clock out paths, the place and route algorithm disclosed herein uses the same delay variable. For example, a delay dcto1 across clock to out path 140 in FPGA 400 may be deemed to be the sum of a delay 1-1, a delay 1-2, and a delay 1-3. Delay 1-1 is the delay from input pin 120 to clocked slice 105. Delay 1-2 is the delay from clocked slice 105 to sequential slice 110. Finally, delay 1-3 is the delay from sequential slice 110 to output pin 125. A delay dcto2 across clock to out path 420 may then include delay 1-3. In other words, dcto2 may be expressed as a sum of a delay 2-1, 2-2, and 1-3. Delay 2-1 is the delay from pin 405 to clocked slice 410. Delay 2-2 is the delay from clocked slice 410 to combinatorial slice 110. Delay 1-3 is not independent as it is common to clock out path 140.

A general bus-based timing optimization technique may now be summarized that accounts for shared path segments (if present) such as discussed above with regard to FIGS. 3 and 4. In an initial act, the various clock to out paths and clock out paths are subdivided with regard to their included slices. For example, if a path includes two slices, then it would be subdivided into three sub-paths. More generally, if a path includes n slices, then it would be subdivided into n+1 sub-paths. Given this subdivision, any common sub-paths between the clock to out paths or between the clock out paths are identified. The delay across the shared sub-path is then shared by the paths that include it as discussed above with regard to FPGA 400. The bus-based algorithm discussed with regard to FPGA 200 may then be applied to optimize the clock to out and clock out timings.

It will be appreciated that the techniques and concepts discussed herein are not limited to the specific disclosed embodiments. The appended claims encompass all such changes and modifications as fall within the true spirit and scope of this invention.

We claim:

1. A method comprising:
   within a processor:
   determining a respective initial delay for each clock to out path in a bus including a plurality of clock to out paths for a programmable logic device;
   forming pairs of each clock to out path in the plurality of clock to out paths;
   for each pair of clock to out paths, determining a delay difference between the initial delay across a first clock to out path in that pair and the initial delay across a remaining second clock to out path in the pair;
   determining, for each clock to out path of the pair, a maximum delay difference between the initial delay and a corresponding clock out delay as well as a minimum delay difference between the initial delay and the corresponding clock out delay;
   for each clock to out path, determining a first difference between the minimum delay difference for the first clock to out path in the pair and the maximum delay difference for the second clock to out path in the pair and determining a second difference between the maximum delay difference for the first clock to out path in the pair and the minimum delay difference for the second clock to out path in the pair;
   determining an individual delay offset range to be added to the initial delay for each of the clock to out paths using the maximum and minimum delay differences, the first differences, and the second differences; and
   placing and routing the clock to out paths for the programmable logic device.

2. The method of claim 1, further comprising: increasing the corresponding clock out delay so that the maximum delay for each clock to out path in the pair is satisfied.

3. The method of claim 2, further comprising: determining a common delay offset for each of the clock to out paths of the pair so that the minimum delay for each clock to out path of the pair is satisfied.

4. The method of claim 3, further comprising:
   placing and routing the clock to out paths for the programmable logic device so that a final delay across each clock to out path is within a delay range for the clock to out path equaling a sum of the clock to out path's initial delay, the clock to out path's individual delay offset range, and the clock to out path's common delay offset.

5. The method of claim 4, further comprising: generating a bitstream to configure the programmable logic device responsive to placing and routing of the clock to out paths.

6. The method of claim 5, further comprising: configuring the programmable logic device with the generated bitstream.

7. The method of claim 6, wherein configuring the programmable logic device comprises configuring a field programmable gate array.

8. The method of claim 3, wherein determining the common delay offset for each clock to out path comprises ensuring that the common delay offset has a magnitude such that a sum of that clock to out path's initial delay, that clock to out path's individual delay offset, and the common delay offset is greater than or equal to a sum of that clock to out path's minimum delay and the corresponding clock out delay.

9. The method of claim 8, wherein determining the common delay offset for each clock to out path further comprises ensuring that the common delay offset has a magnitude such that the sum of that clock to out path's initial delay, that clock to out path's individual delay offset, and the common delay offset is less than or equal to a sum of that clock to out path's maximum delay and the corresponding clock out delay.

10. The method of claim 1, wherein determining the initial delay for each clock to out path comprises determining a minimized initial delay for each clock to out path.

11. A system, comprising:
a memory for storing instructions; and
a processor configured to execute the stored instructions, wherein the stored instructions upon execution by the processor cause the processor to:
determine a respective initial delay for each clock to out path in a bus including a plurality of clock to out paths for a programmable logic device;
form pairs of each clock to out path in the plurality of clock to out paths;
for each pair of clock to out paths, determine a delay difference between the initial delay across a first clock to out path in that pair and the initial delay across a remaining second clock to out path in the pair;
determine, for each clock to out path of the pair, a maximum delay difference between the initial delay and a corresponding clock out delay as well as a minimum delay difference between the initial delay and the corresponding clock out delay;
for each clock to out path, determine a first difference between the minimum delay difference for the first clock to out path in the pair and the maximum delay difference for the second clock to out path in the pair and determine a second difference between the maximum delay difference for the first clock to out path in the pair and the minimum delay difference for the second clock to out path in the pair;
determine an individual delay offset range to be added to the initial delay for each of the clock to out paths using the maximum and minimum delay differences, the first differences, and the second differences so that there is a difference in delays between the clock to output paths of the pair greater than or equal to the first difference and less than or equal to the second difference; and
placing and routing the clock to out paths for the programmable logic device.

12. The system of claim 11, wherein the stored instructions upon execution by the processor further cause the processor to:
increase the corresponding clock out delay so that the maximum delay for each clock to out path is satisfied.

13. The system of claim 12, wherein the stored instructions upon execution by the processor further cause the processor to:
determine a common delay offset for each of the clock to out paths so that the minimum delay for each clock to out path is satisfied.

14. The system of claim 13, wherein the stored instructions upon execution by the processor further cause the processor to:
place and route the clock to out paths for the programmable logic device so that a final delay across each clock to out path is within a delay range for the clock to out path equaling a sum of the clock to out path's initial delay, the clock to out path's individual delay offset range, and the clock to out path's common delay offset.

15. The system of claim 11, wherein the stored instruction upon execution by the processor further cause the processor to configure the programmable logic device with a bitstream so that the minimum delay and the maximum delay for each clock to out path is satisfied.

16. A non-transitory computer-readable storage medium having instructions stored thereon, wherein the instructions when executed by a processor cause the processor to:
determine a respective initial delay for each clock to out path in a bus including a plurality of clock to out paths for a programmable logic device;
form pairs of each clock to out path in the plurality of clock to out paths;
for each pair of clock to out paths, determine a delay difference between the initial delay across a first clock to out path in that pair and the initial delay across a remaining second clock to out path in the pair;
determine, for each clock to out path of the pair, a maximum delay difference between the initial delay and a corresponding clock out delay as well as a minimum delay difference between the initial delay and the corresponding clock out delay;
for each clock to out path, determine a first difference between the minimum delay difference for the first clock to out path in the pair and the maximum delay difference for the second clock to out path in the pair and determine a second difference between the maximum delay difference for the first clock to out path in the pair and the minimum delay difference for the second clock to out path in the pair;
determine an individual delay offset range to be added to the initial delay for each of the clock to out paths using the maximum and minimum delay differences, the first differences, and the second differences so that there is a difference in delays between the clock to output paths of the pair greater than or equal to the first difference and less than or equal to the second difference; and
placing and routing the clock to out paths for the programmable logic device.

17. The non-transitory computer-readable storage medium of claim 16, wherein the instructions when executed by the processor further cause the processor to:
generate a bitstream to configure a programmable logic device responsive to the determination of the place and route for the clock to out path and to the revision of the initial place and route for the clock out path.

18. The non-transitory computer readable storage medium of claim 17, wherein the instructions when executed by the processor further cause the processor to minimize the initial delay for each clock to out path.

19. The non-transitory computer readable storage medium of claim 16, wherein the instructions when executed by the processor further cause the processor to: increase the corresponding clock out delay so that the maximum delay for each clock to out path is satisfied.

* * * * *